(12) United States Patent
Burbaum et al.

(10) Patent No.: US 11,890,696 B2
(45) Date of Patent: Feb. 6, 2024

(54) LASER METAL DEPOSITION WITH INOCULATION

(71) Applicant: SIEMENS AKTIENGESELLSCHAFT, Munich (DE)

(72) Inventors: Bernd Burbaum, Falkensee (DE); Ahmed Kamel, Orlando, FL (US)

(73) Assignee: Siemens Aktiengesellschaft, Munich (DE)

(*) Notice: Subject to any disclaimer, the term of this patent is extended or adjusted under 35 U.S.C. 154(b) by 328 days.

(21) Appl. No.: 16/965,893

(22) PCT Filed: Jan. 15, 2019

(86) PCT No.: PCT/US2019/013570
§ 371 (c)(1),
(2) Date: Jul. 29, 2020

(87) PCT Pub. No.: WO2019/152178
PCT Pub. Date: Aug. 8, 2019

(65) Prior Publication Data
US 2021/0023618 A1 Jan. 28, 2021

Related U.S. Application Data

(63) Continuation of application No. 15/883,720, filed on Jan. 30, 2018, now Pat. No. 10,835,996.

(51) Int. Cl.
*B23K 26/34* (2014.01)
*B23K 26/354* (2014.01)
(Continued)

(52) U.S. Cl.
CPC ........... *B23K 26/34* (2013.01); *B22F 1/10* (2022.01); *B22F 3/24* (2013.01); *B22F 10/00* (2021.01);
(Continued)

(58) Field of Classification Search
CPC ............ B22F 10/20; B22F 2003/247; B22F 2998/10; B22F 10/00; B22F 10/10;
(Continued)

(56) References Cited

U.S. PATENT DOCUMENTS 10,675,713 B2* 6/2020 Yang .................... B23K 26/322
2011/0208304 A1* 8/2011 Justin ...................... C23C 24/10
216/37

(Continued)

FOREIGN PATENT DOCUMENTS

CN 104684867 A 6/2015
CN 105817628 A 8/2016
(Continued)

OTHER PUBLICATIONS

PCT International Search Report and Written Opinion of International Searching Authority dated May 2, 2019 corresponding to PCT International Application No. PCT/US 2019/013570 filed Jan. 15, 2019.
(Continued)

*Primary Examiner* — Philip C Tucker
*Assistant Examiner* — Jimmy R Smith, Jr.
(74) *Attorney, Agent, or Firm* — Henry M. Feiereisen LLC

(57) ABSTRACT

Systems and methods for additively manufacturing or repairing a component from a base material. The system may include an inoculation source to direct inoculation materials and a laser metal deposition (LMD) system to direct laser energy during laser processing of additive materials deposited in a melt pool on the base material. The LMD system includes a laser energy source configured to direct laser energy towards the base material and inoculation materials to form the melt pool thereon and to process the
(Continued)

deposited additive materials and inoculation materials to form layers on the base material upon solidification.

4 Claims, 2 Drawing Sheets

(51) Int. Cl.
| | |
|---|---|
| *B33Y 30/00* | (2015.01) |
| *B29C 64/393* | (2017.01) |
| *B33Y 10/00* | (2015.01) |
| *B23P 6/00* | (2006.01) |
| *B23K 26/144* | (2014.01) |
| *F01D 5/00* | (2006.01) |
| *B23K 1/00* | (2006.01) |
| *B23K 26/00* | (2014.01) |
| *B23K 26/70* | (2014.01) |
| *B22F 10/00* | (2021.01) |
| *B22F 3/24* | (2006.01) |
| *B22F 1/10* | (2022.01) |
| *B33Y 40/10* | (2020.01) |
| *B22F 10/22* | (2021.01) |
| *B22F 10/25* | (2021.01) |
| *B22F 12/53* | (2021.01) |
| *B22F 10/64* | (2021.01) |
| *B22F 10/66* | (2021.01) |
| *B23K 101/00* | (2006.01) |
| *B23K 103/08* | (2006.01) |
| *B33Y 40/20* | (2020.01) |

(52) U.S. Cl.
CPC .............. *B22F 10/22* (2021.01); *B22F 10/25* (2021.01); *B22F 10/64* (2021.01); *B22F 10/66* (2021.01); *B22F 12/53* (2021.01); *B23K 1/0018* (2013.01); *B23K 26/0006* (2013.01); *B23K 26/144* (2015.10); *B23K 26/354* (2015.10); *B23K 26/70* (2015.10); *B23P 6/007* (2013.01); *B29C 64/393* (2017.08); *B33Y 10/00* (2014.12); *B33Y 30/00* (2014.12); *B33Y 40/10* (2020.01); *F01D 5/005* (2013.01); *B22F 2003/247* (2013.01); *B22F 2202/11* (2013.01); *B22F 2301/15* (2013.01); *B22F 2998/10* (2013.01); *B23K 2101/001* (2018.08); *B23K 2103/08* (2018.08); *B33Y 40/20* (2020.01); *F05D 2230/234* (2013.01); *F05D 2230/30* (2013.01)

(58) Field of Classification Search
CPC .... B22F 1/10; B22F 2202/11; B22F 2301/15; B22F 3/24; B22F 5/04; B23K 26/00; B23K 1/0018; B23K 2101/001; B23K 2103/08; B23K 26/0006; B23K 26/144; B23K 26/34; B23K 26/354; B23K 26/70; B23P 6/007; B33Y 10/00; B33Y 30/00; B33Y 40/00; B33Y 40/20; F01D 5/005; F05D 2230/22; F05D 2230/234; F05D 2230/30; F05D 2230/31; F05D 2300/175; B29C 64/141; B29C 64/153; B29C 64/393; Y02P 10/25
See application file for complete search history.

(56) References Cited

U.S. PATENT DOCUMENTS

| | | |
|---|---|---|
| 2014/0099476 A1 | 4/2014 | Subramanian et al. |
| 2014/0259666 A1 | 9/2014 | Baughman et al. |
| 2015/0306667 A1 | 10/2015 | Yao |
| 2016/0067828 A1* | 3/2016 | Liebl ...................... C23C 16/06 427/551 |
| 2016/0175929 A1 | 6/2016 | Colin et al. |
| 2016/0215364 A1 | 7/2016 | Bruck et al. |
| 2016/0273079 A1 | 9/2016 | Das et al. |
| 2017/0182595 A1 | 6/2017 | Nelson et al. |
| 2019/0299289 A1* | 10/2019 | Aota ...................... B22F 3/101 |

FOREIGN PATENT DOCUMENTS

| | | |
|---|---|---|
| EP | 0411322 A1 | 2/1991 |
| EP | 2776190 A1 | 9/2014 |
| EP | 2777867 A1 | 9/2014 |
| JP | H055585 B2 | 1/1993 |

OTHER PUBLICATIONS

"Welding Society of Chinese Mechanical Engineering Society China Science and Technology Press" Welding Technology Roadmaps; pp. 125-129, Nov. 30, 2016.

Wu, Kai et al: "Research and Development of Ni-based Superalloy Fabricated by Laser Additive Manufacturing Technology"; Journal of Iron and Steel Research; vol. 29, No. 12, pp. 953-959, Dec. 31, 2017.

* cited by examiner

LASER METAL DEPOSITION WITH INOCULATION

BACKGROUND

1. Field

The present invention relates to the field of material technology, and more particularly to additive manufacturing and repair methods using laser metal deposition with inoculation.

2. Description of the Related Art

Welding of superalloys presents a variety of technical challenges because of the high strength (and corresponding low ductility) that these alloys are optimized to achieve. Heat sources such as lasers and arcs are being applied to build additively manufactured (AM) parts or repair damaged superalloy components. Unfortunately, these alloys are very prone to hot cracking during, i.e. laser metal deposition (LMD) processes and subsequent heat treatment. The hot cracking during welding at room temperature normally occurs at the solid-liquid interface in the melt pool, which structurally compromises the integrity of the AM or repaired component.

SUMMARY

In one aspect of the present invention, a system for additively manufacturing or repairing a superalloy component from a base material comprises: an inoculation source operably configured to direct inoculation materials onto a base material during laser processing; a laser metal deposition (LMD) system comprising: a laser energy source operably configured to direct a laser energy towards the base material and inoculation materials for forming a melt pool thereon and for laser processing additive materials deposited into the melt pool for forming a layer on the base material of additive materials and inoculation materials.

In another aspect of the present invention, an additive manufacturing or repair method comprising: preparing a base material substrate for laser metal deposition processing; depositing inoculation materials onto the base material substrate; and commencing laser metal deposition processing of the base material substrate by melting at least portions of the base material substrate and inoculation and depositing additive materials into the melted portions to form a build-up layer of the additive materials and inoculation on the base material substrate.

These and other features, aspects and advantages of the present invention will become better understood with reference to the following drawings, description and claims.

BRIEF DESCRIPTION OF THE DRAWINGS

The invention is shown in more detail by help of figures. The figures show preferred configurations and do not limit the scope of the invention.

DETAILED DESCRIPTION

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Broadly, embodiments of the present invention provide systems and methods for additively manufacturing or repairing a component from a base material. The system may include an inoculation source to direct inoculation materials and a laser metal deposition (LMD) system to direct laser energy during laser processing of additive materials deposited in a melt pool on the base material. The LMD system includes a laser energy source configured to direct laser energy towards the base material and inoculation materials to form the melt pool thereon and to process the deposited additive materials and inoculation materials to form layers on the base material upon solidification.

A system or process that suppresses hot cracking occurring during welding is desired. Embodiments described below allow for the suppression of hot cracking during the welding process.

Figure 1:
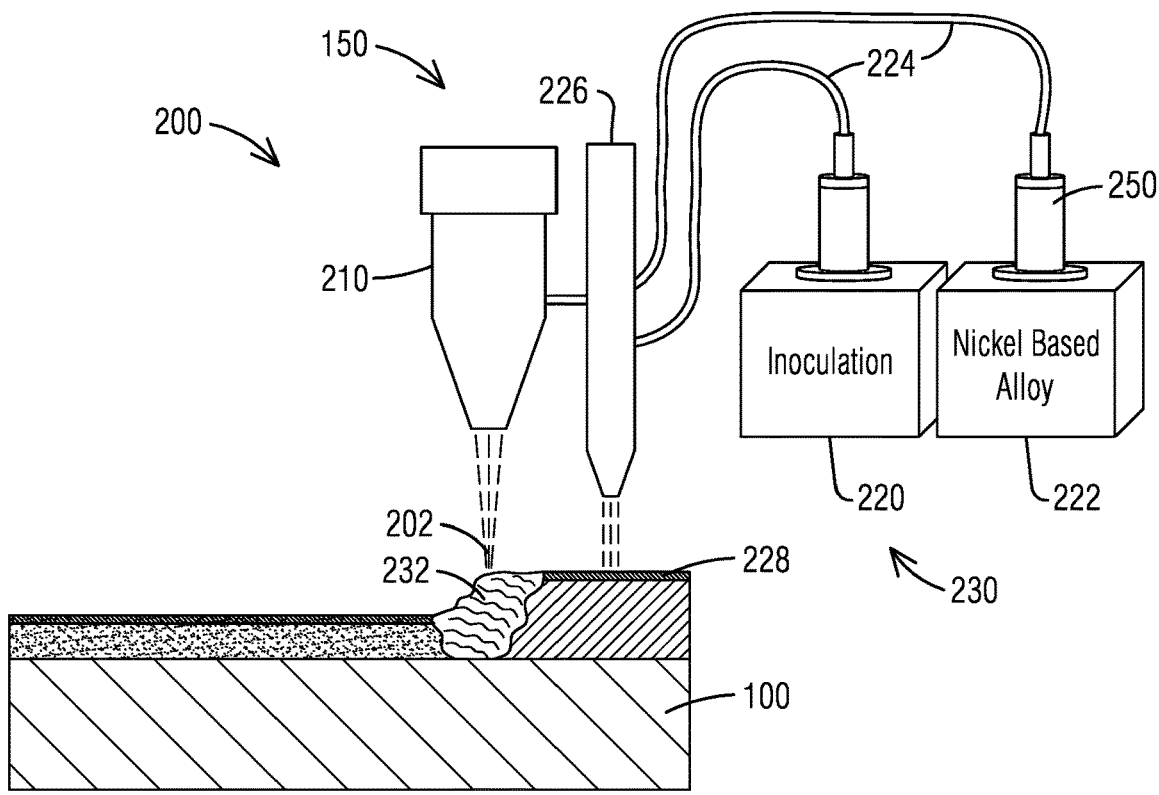
FIG. 1 is a schematic illustrating a system for additively manufacturing and/or repairing superalloy components via laser metal deposition (LMD) according to an exemplary embodiment of the present invention.
Figure 2:
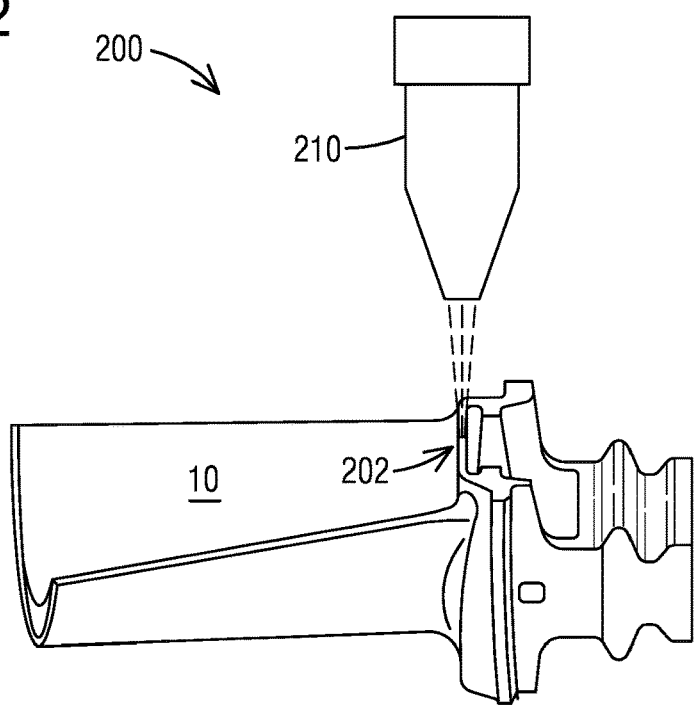
FIG. 2 is a schematic illustrating a portion of a system for additively manufacturing and/or repairing superalloy turbine components via laser metal deposition (LMD) according to an exemplary embodiment of the present invention.

FIGS. 1 and 2 illustrate a system for additive manufacturing a component from a base material/substrate 100 and/or repairing a superalloy component via laser metal deposition (LMD) 200. FIG. 1 illustrates a generic component and FIG. 2 illustrates a specific example of a blade. Shown in both FIG. 1 and FIG. 2 is the system that may include an inoculation system 230 and an LMD system 200 for applying a laser energy 202, via a laser energy source 210, to an underlying substrate, and for depositing additive/build-up materials into a melt pool 232 of the underlying/base substrate 100 and inoculation materials 220 (or onto a solidified layer of the build-up material) resulting from the laser energy 202 to form layers of the build-up materials for manufacturing or repairing a desired superalloy component such as a blade, a blade platform side face, blade tips, vanes, or other components. The laser energy source 210 may be operably configured to direct or emit laser energy 202 directed towards the base material 100 and inoculation materials 220 in a laser beam for melting portions of the base material 100 and inoculation materials 220 (or a previously solidified build-up layer) to form the melt pool 232.

Additionally or alternatively, the LMD system 200 may also include a laser deposition tool operatively connected to the laser energy source 210 and in proximity of or operably coupled to the laser energy source 210 for depositing the additive materials 222 into the melt pool 232 formed form the laser energy 202, the melt pool 232 formed on the base material 100 and inoculation materials 220.

Additionally or alternatively, the laser energy source 210 may be operatively configured to function as the laser deposition tool for depositing the additive materials 222 into the melt pool 232. The additive materials 222 may be deposited via the laser energy source 210 via at least one feed line 224 connected to a housing shared with the laser energy source 210, in addition to or instead of being deposited via the deposition tool. The LMD system 200 may also include or be operatively connected to one or more powder feed systems 250. The powder feed systems 250 may be configured to feed (deliver) the additive materials 222 to one or more of the laser energy source 210 or laser deposition tool for depositing the additive materials 222 into the melt pool 232 for forming layers of the build-up material to form a desired component.

The additive materials 222 may include a base alloy powder material, that may include the same or similar materials forming the base material 100. Additive material powder may be fed through the LMD system 200 via the powder feed system 250 and deposited into the melt pool 232 during the LMD process 200. The additive material may be a base alloy, a braze alloy, or a base alloy and a braze alloy mixture.

In order to improve the system 150, the system 150 also includes an inoculation system 230 that includes an inoculation feed 226. The inoculation feed 226 may be operably configured to direct inoculation materials 220 onto the base material 100 before or during laser processing. The inoculation feed 226 may be a spray gun nozzle, a pasting device, or the like. The inoculation materials 220 deposited on the base material 100 form an initial inoculation layer 228 along the surface of the component. The inoculation materials 220 can be for example, but are not limited to, TiC, TaC, and TiN. In certain embodiments, a solvent can be used to deposit the particles homogeneously on the surface. An example of a solvent that can be used is acetone. The inoculation materials 220 are deposited on the base material 100 prior to the LMD system 200. Therefore, the melt pool 232 includes the inoculation materials 220.

Figure 3:
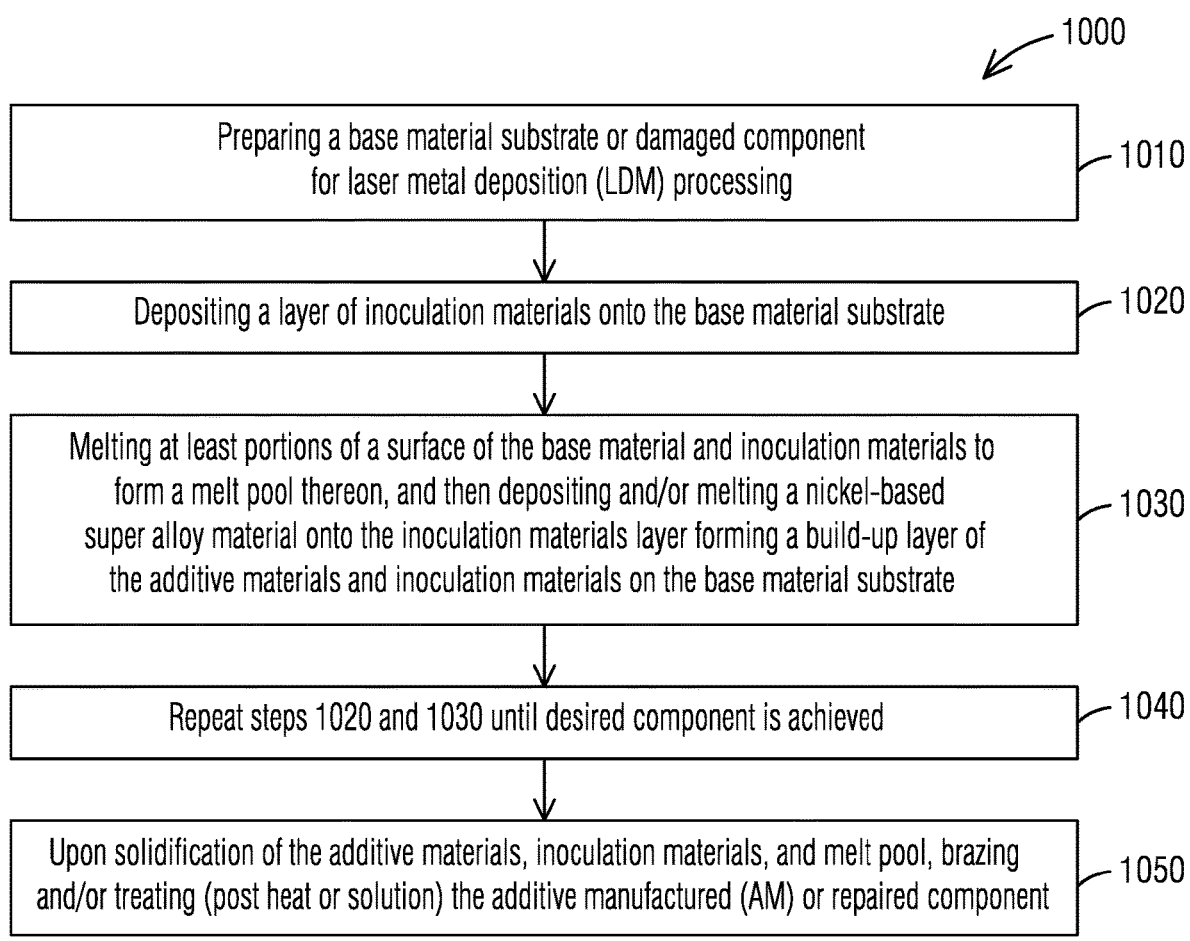
FIG. 3 is a block diagram of an additive manufacturing or repair process according to an exemplary embodiment of the present invention.

Referencing FIG. 3, an embodiment of an additive manufacturing or repair method is provided. The method 1000 includes the step of preparing a base material substrate 100 for laser metal deposition processing (1010). Where the component is being repaired, the steps may include the component removed from an industrial machine. Excavation of any damaged portions of the component along with any pre-heat or solution treatment of the component may also be steps taken prior to the LMD processing.

The method includes depositing inoculation materials 220 onto the base material substrate 100 to form an inoculation layer 228 (1020). The inoculation materials 220 may be in powder form. LMD processing may then commence. At least a portion of the base material substrate 100 and the inoculation materials 220 are melted into a melt pool 232. Additive materials 222 are then deposited into the melted portions to form a build-up layer of the additive materials 222 and inoculation materials 220 on the base material substrate 100. The melt pool 232 may be protected by a shielding gas, such as argon, helium, or the like, during this step. The additive materials 222 may be transported to the melt pool 232 using the shielding gas. As the additive materials 222 are being deposited, laser energy 202 melts the materials and subsequently solidifies forming a layer of superalloy material forming the desired part (1030).

While in the LMD process 200, the laser beam of laser energy 202 may oscillate within a powder nozzle so that the beam is agitated in the melt pool 232. The powder nozzle, or similar laser energy source 210, an instrument to provide the laser energy 202 or the laser energy 202 and powder additive materials 222. An additive material with superalloy powder is applied along with the inoculation materials as a build-up layer. After this layer is welded a new layer with inoculation materials 220 may be added on the welded layer and the LMD process 200 repeated until desired (1040).

Once the melt pool 232 with the inoculation materials 220 and the additive materials 222 has been solidified, post treatment can be additionally run. Post treatment such as high temperature brazing and/or treating, with post heat or solution, the additively manufactured (AM) or repaired component (1050).

High gamma prime ($\gamma'$) alloys are very prone to hot cracking during the LMD process 200 and subsequent heat treatments. Gamma prime ($\gamma'$) being a primary strengthing phase in nickel-based superalloys. A very fine grain structure in a zone where the welding takes place can significantly reduce the hot cracking phenomena during the welding and heat treatment. A very fine grain structure is a grain structure with a grain size of less than 200 µm. A very fine grain size can be achieved by depositing the inoculation material layer on the surface of the base material 100 before the remelting process is started.

Further, in additional embodiments, the oscillation of the laser beam during the LMD approach 200 along with the use of inoculation materials 220 can lead to achieve ultrafine grain size structures during the solidification process.

Welding technology available for high gamma prime alloys, like Alloy 247 and Rene 80 for example, have not been available. Providing an inoculation materials layer and oscillating the laser beam prior to the addition of additive materials 222 through a LMD process 200 allows for the production of fine grain size structures that are hot cracking resistant.

It should be appreciated that aspects of the exemplary LMD system 200 disclosed herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc), which may include but is not limited to firmware, resident software, microcode, etc.

Furthermore, parts of the processor system can take the form of a computer program product accessible from a processor-usable or processor-readable medium providing program code for use by or in connection with a processor or any instruction execution system. Examples of processor-readable media may include non-transitory tangible processor-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof

What is claimed is:

1. A system for additively manufacturing or repairing a superalloy component from a base material comprising:
    an inoculation feed operably configured to direct inoculation materials onto the base material before or during laser processing;
    a powder nozzle configured to deliver additive materials comprising a nickel based superalloy for laser processing after delivery;

a laser metal deposition system comprising a laser energy source operably configured to direct a laser beam towards the base material and the inoculation materials for forming a melt pool thereon and for laser processing the additive materials deposited into the melt pool for forming a layer on the base material of the additive materials and the inoculation materials, and the laser energy source further being operably configured to function as a laser deposition tool for depositing the additive materials via a feed line into the melt pool; and a processor configured to oscillate the laser beam within the powder nozzle so that the laser beam is agitated in the melt pool prior to depositing the additive materials into the melt pool.

2. The system according to claim 1, wherein the inoculation feed directs the inoculation materials onto the base material by spray through a spray gun nozzle.

3. The system according to claim 1, wherein the inoculation feed directs the inoculation materials onto the base material by paste.

4. The system according to claim 1, further comprising a solvent used to direct the inoculation materials homogeneously on the base material.

\* \* \* \* \*